Jan. 12, 1971 W. F. LE FEVRE 3,554,596

CAB SUPPORT

Original Filed Dec. 8, 1965 5 Sheets-Sheet 1

INVENTOR.
WILLIAM F. LeFEVRE

BY Watts & Fisher

ATTORNEYS

INVENTOR.
WILLIAM F. LeFEVRE
BY
Watts & Fisher
ATTORNEYS

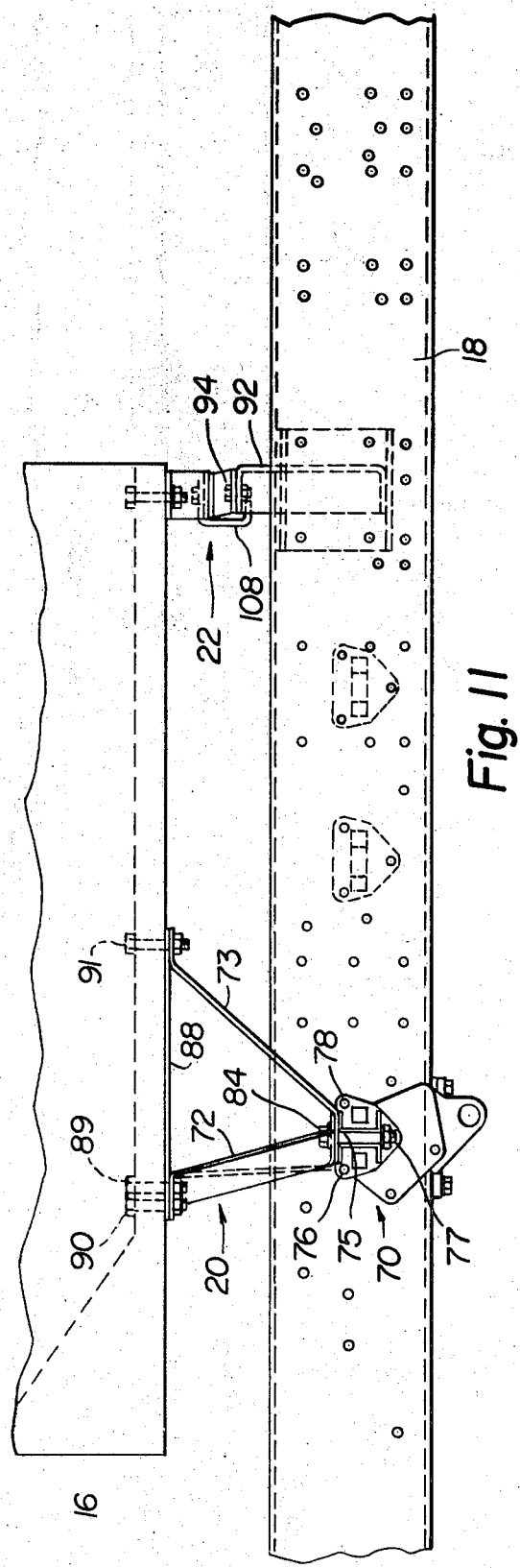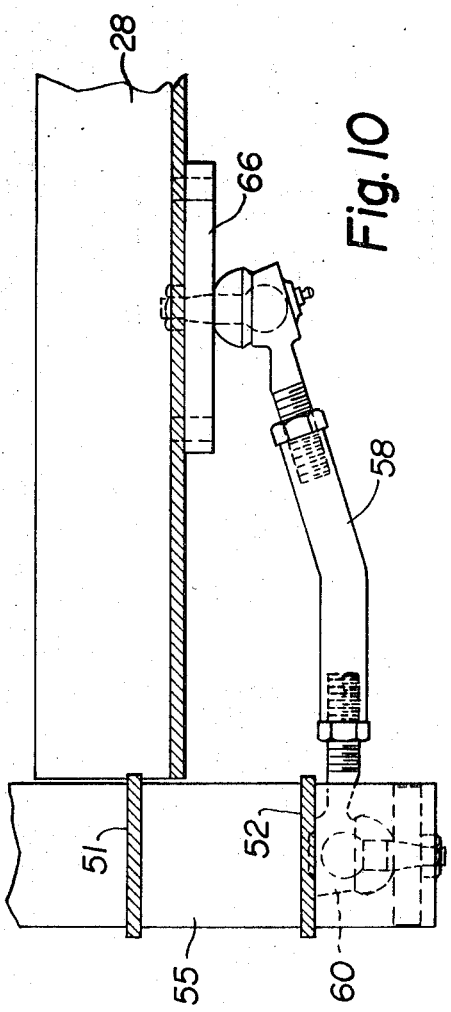

INVENTOR.
WILLIAM F. LeFEVRE
BY Watts & Fisher
ATTORNEYS.

United States Patent Office 3,554,596
Patented Jan. 12, 1971

3,554,596
CAB SUPPORT
William F. Le Fevre, Shaker Heights, Ohio, assignor to White Motor Corporation, Cleveland, Ohio, a corporation of Ohio
Continuation of application Ser. No. 512,285, Dec. 8, 1965. This application Feb. 6, 1969, Ser. No. 834,916
Int. Cl. B62d 33/06
U.S. Cl. 296—28                                    10 Claims

ABSTRACT OF THE DISCLOSURE

A spring is interposed between a truck cab and frame. The spring rate changes the inherent frequency of cab vibration to establish ratios of frequencies of different frame vibrations to cab vibrations that fall outside specified limits. The front pivoted end of a tiltable over-engine cab is spring mounted.

CROSS REFERENCE TO RELATED APPLICATION

This application is a continuation of co-pending application Ser. No. 512,285, entitled Cab Support, filed Dec. 8, 1965, now abandoned.

This invention relates to the mounting of a body upon a chassis frame of a motor vehicle and more particularly to the mounting of a motor truck cab upon its frame.

When a truck is driven in the normal manner along conventional road structures, various portions of the vehicle vibrate due to road unevenness, wheel imbalance, and imbalance in moving parts, such as the motor, etc. Different components of the vehicle tend to vibrate at inherent or natural frequencies that depend upon the location and construction of the components. The different components will vibrate in different ways and at different frequencies from each other; yet, within a general class of vehicles, the frequencies of comparable vibrations are usually of the same general order of magnitude. For example, motor trucks having cabs that are mounted on the frame separately from the load carrying portion of the truck will vibrate with certain typical motions. In general, it has been found that trucks of this general type are subject to several types of vibration which include: (1) flexing of the frame about two spaced nodes at the rate of about 10 cycles per second; (2) chassis flexure or pitch about the center of the frame, which is at a rate of about two cycles per second; (3) wheel vibrations, the frequency of which varies at different speeds of truck movement; (4) a natural frequency of vibration of the cab assembly of 10 to 12 cycles per second; and (5) an engine vibration about 600 cycles per second.

One major factor contributing to driver discomfort is the fact that the cab itself acts as a sounding box for vibrations coming from the frame. Thus, vibrations of the chassis, wheels, and motor cause the cab to vibrate and are in fact amplified by the cab. This cab amplification of frame vibrations is particularly troublesome where the natural frequency of vibration of the cab is the same as or very similar to the frequency of vibration of the source or driving frequency; for example, where it is the same as the frame flexure, chassis pitch, or wheel vibration. Where such a situation exists, the cab resonates, greatly amplifying the driving vibrations. Wheel vibrations are materially reduced by shock absorbers and generally are amplified only at certain relatively low speeds, because the frequency changes with the vehicle speed. Engine vibrations are materially isolated with rubber mounting bushings at the pivot points. Thus, of the five types of frequencies listed above, the principle problems emanate from frame and chassis flexures.

In automotive design it is common to mount the car body on the frame at the two nodes of frame flexure, and thereby isolate frame vibrations from the car body. With truck design, this is not possible because one node is well rearward of the cab. It has been customary with trucks to simply support the cab by bolting it to the frame at three spaced locations and to reduce vibrations with rubber bushings interposed between the frame and the cab at these three locations. It has also been suggested in cab-behind-engine trucks to fasten the cab to the truck chassis at one longitudinal location near one node and interpose a spring between the cab and chassis at another location. This spring is to absorb and cushion the cab pitch which results from the frame flexing between the nodes. This alone is not enough to reduce the cab amplification of vibrations generated by other portions of the vehicle and in fact may cause an increase in such amplification. Furthermore, to reduce cab pitch in a cab-over-engine truck, such a spring must be located between the front of the cab and the frame. This has not been done in the past because of the difficulty in interposing springs between the front of the cab and the frame while still providing tilting about the front end.

The present invention provides a solution to the problem of minimizing cab pitch, particularly in cab-over-engine trucks, and at the same time minimizes truck cab amplification of frame vibration about two longitudinally spaced nodes, and chassis pitch vibrations about the center of the frame.

It has been found that the characteristics of the spring itself are of primary importance if vibration amplification is to be reduced toward a minimum. By selecting a spring with proper characteristics related to the cab, frame, and chassis frequencies cab amplification of frame vibrations is minimized. Thus, the spring, if properly selected will change the natural frequency of the cab so that it dampens rather than amplifies.

In accordance with this invention, novel structure is provided for mounting a cab upon a truck frame, such structure including relatively fixed mountings and also springs between the frame and the cab that reduce the frequency at which the cab tends to vibrate. A particularly novel arrangement has been provided for providing such a spring structure in combination with a cab over engine tilting cab. The springs of the present invention are constructed and arranged to reduce the natural or inherent frequency of vibration of the cab member of the truck to a value where the frame flexure vibrations will not be greatly amplified. At the same time, the natural frequency of vibration of the cab is maintained at a level sufficiently above the frequency of vibration of the chassis pitch so as not to merely replace the amplification of one type of vibrations for another.

The attendant advantages of this invention and the various embodiments thereof will be readily appreciated as the same become better understood by reference to the following detailed description when considered in connection with the accompanying drawings in which:

FIG. 10 is a top plan view showing in detail a portion of the tilt suspension of FIG. 7;

FIG. 11 is a partial sied elevational view of a truck frame, cab and cab support, including a fixed support adjacent the front of the cab and a vibration dampening spring adjacent the rear of the cab;

Reference will first be made to FIGS. 1 to 6 in an explanation of the function and selection of a suitable spring mounting for reducing the amplification of vibrations by the truck cab. A description of the particular constructions for attaining the reduced amplification in both cab-over and cab-behind-engine trucks as shown in FIGS. 7 to 13 will follow.

Figure 1:
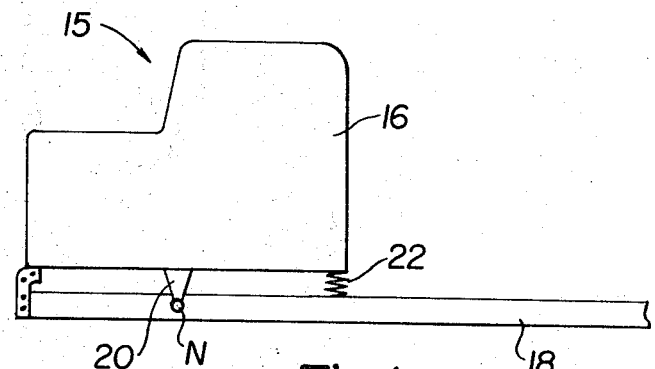
FIG. 1 is a diagram illustrating the relative locations of a cab mounting bracket and a vibration dampening spring with respect to the truck frame for a cab-behind-engine truck.

FIG. 1 is a schematic diagram of a cab-behind-engine type truck 15 in which a cab 16 is supported upon a frame or chassis 18 at a fixed location N along the frame 18. The cab 16 is fixed to the frame 18 at location N by two transversely spaced mounting brackets 20 that permit pivotal movement of the cab 16 about a horizontal, transverse axis across the frame through location N. The brackets 20 are mounted forward of the center of gravity of the cab. A resilient element 22, functioning as a spring, is fastened to the frame 18 and the cab 16 beneath the cab and adjacent a rear portion thereof.

Figure 2:
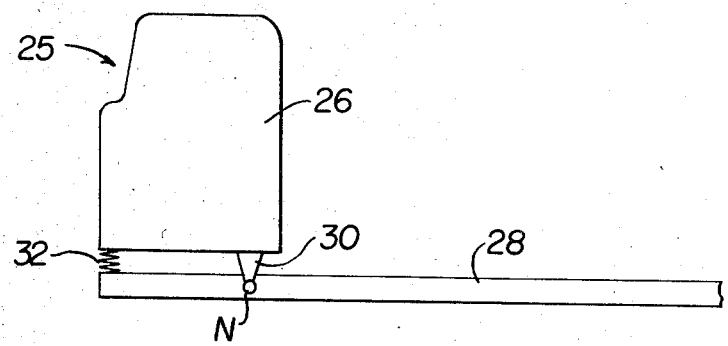
FIG. 2 is a diagram showing the relationship of a cab support and vibration dampening spring with respect to a truck frame for a cab-over-engine truck.

In FIG. 2, a cab-over-engine type of truck 25 is shown having a cab 26 mounted on a frame 28 at the location N. The cab 26 is fixed to the frame 28 at point N by a pair of transversely spaced mounting brackets 30 that permit limited pivotal movement of the cab 26 about the location N. The brackets 30 are mounted rearwardly to the center of gravity of the cab. In this embodiment, the mounting brackets 30 include a release to permit the cab to be tilted about the front. The cab is resiliently mounted at the front by springs 32 between the cab 26 and the frame 28.

Figure 3:
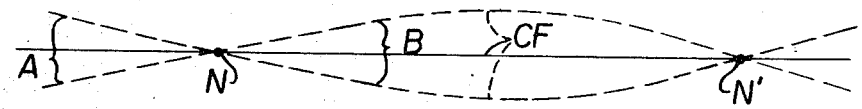
FIG. 3 is a diagram of the truck frame as shown in FIGS. 1 and 2, illustrating the manner in which the frame flexes about two spaced nodes along its length.
Figure 4:
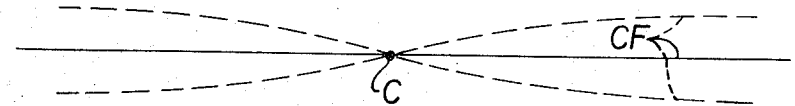
FIG. 4 is a diagram of the truck frame as shown in FIGS. 1 and 2, illustrating the manner in which the frame flexes about the center.

A longitudinal center line of the frame 18 or 28 of FIGS. 1 and 2 is shown diagrammatically by the line CF in FIGS. 3 and 4. The solid line CF indicates the shape of the frame when at rest. During movement of the truck 15 or 25, the frame members 18 or 28 flex about two spaced nodes N and N', as shown in FIG. 3 and about the center of the frame C as shown in FIG. 4. The node N in FIG. 3 corresponds with the location N in FIGS. 1 and 2, at which the cab 16 and the cab 26 are secured to the frame members. The distance A at the front of the frame indicates the amplitude of the frame flexure at the point where the cab 26 is connected by resilient means 32 to the frame. The distance indicated at B in FIG. 3 indicates the amplitude of frame flexure at the point where the cab 16 is connected by resilient means 22 to the frame.

By attaching the cab 16 or 26 or the frame 18 or 28, respectively, at the point N, i.e., at one node about which the frame flexes, the transmission of vibrations from frame flexure to the cab is, of course minimized. However, vibrations are still transmitted through the other mounting means. In this case, resilient means 22 or 32 is used to minimize pitch movement of the cab occasioned by frame flexure. Furthermore, the cab is subjected to pitch vibration about the center C of the frame, as illustrated in FIG. 4, through both the fixed mounting means and the resilient mounting means. Thus, the cab will still tend to be vibrated by the frame, even though resilient means 22 and 32 are used. Nevertheless, if the characteristics of the spring means 22 or 32 are selected so as to properly modify the inherent or natural frequency of vibration of the cab, there will be relatively little amplification of the vibrations transmitted to the cab from the frame. Thus, it should be clear, that the present invention is dealing with the problem of frequency amplification as well as the problem of reducing the force of transmitted vibrations.

Figure 5:
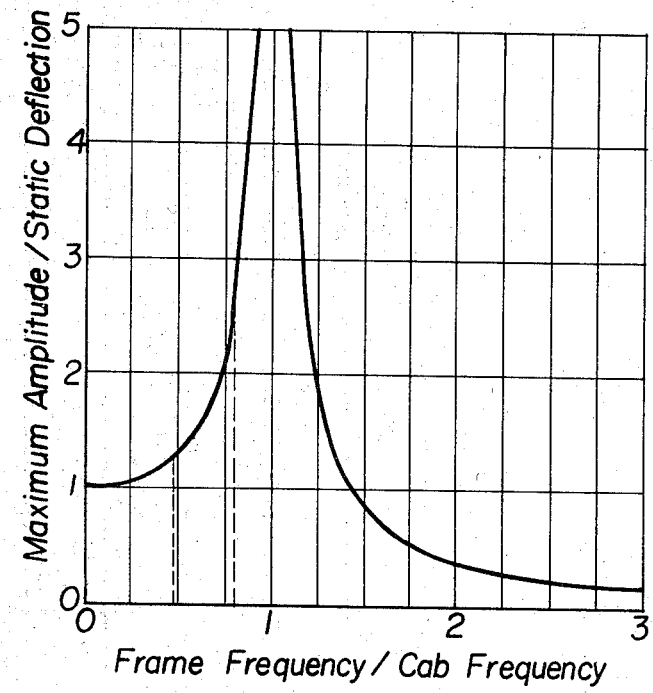
FIG. 5 is a graph of amplitudes of forced vibration showing the manner in which a truck cab magnifies the amplitude of the frame vibrations, as a function of the ratio of the frame frequency to the undamped cab frequency.
Figure 6:
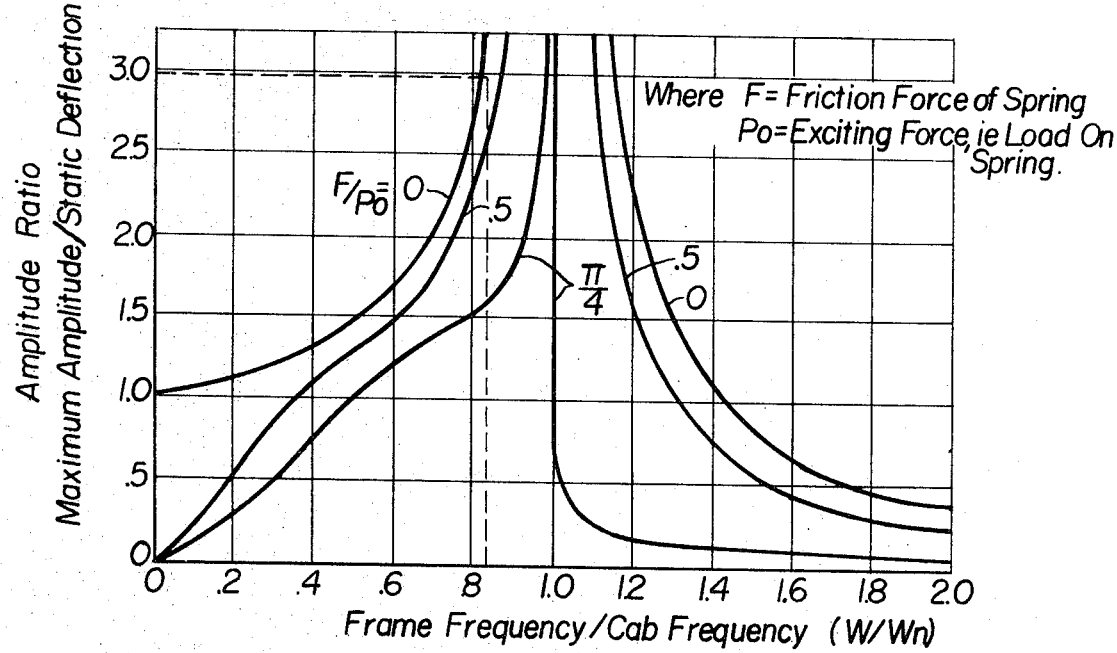
FIG. 6 is a resonance diagram showing the relationship between the amplitude ratio of the cab with respect to the ratio of frame frequency vibration to cab vibration frequency, with a family of curves for different damping springs that provide the indicated ratios of spring friction force to the load on the spring.

The manner in which the resilient element 22 or 32 reduces the cab amplification of frame vibration and the manner of selecting the resilient element for best achieving this will be best understood from the diagrams of FIGS. 5 and 6.

The diagram of FIG. 5 shows a curve of undamped cab amplification, illustrating the manner in which the magnification factor or amplitude ratio, of the cab vibration varies as a function of the frequency ratio of frame vibration to cab vibration. As the diagram indicates, where the ratio of frame frequency to cab frequency is one, the two are in resonance and the magnification factor is infinite. From this diagram, it will be seen that it is desirable to maintain the ratio of frame frequency to cab frequency very low, for example, 0.7 or less; or relatively high, for example, about 1.5 or 2 or above. Of course, more than one type of vibration and vibration frequency is transmitted to the cab through the frame and to the extent these are significant, their relationship to the cab frequency must be considered.

The selection of a particular spring for varying the cab frequency in a manner to reduce the magnification factor, while considering both the frame flexure about the two spaced nodes and the chassis pitch about the center of the frame will be best understood in connection with a specific example, using the typical frequencies of vibrations described above.

A typical truck as diagrammatically shown in FIG. 1 may have a chassis pitch frequency of two cycles per second about the center of the frame, a frame flexure vibration frequency of ten cycles per second about two longitudinally spaced nodes, and a natural cab vibration frequency of about ten to twelve cycles per second, although the latter generally has to be determined from the measured cab amplitde ratio, i.e., from the ratio of maximum amplitude to static deflection, in the manner yet to be described. Because the natural frequency of the cab is very close to the driving frequency of the frame flexure about the two spaced nodes, the cab will magnify to a great extent the vibrations of the frame.

It has been found that a spring 22 fastened to the central portion of the back of the cab 16 between the bottom of the cab and the frame 18 will if properly selected not only support and cushion the back of the cab, but will also reduce the cab amplification of frame vibrations by changing the natural frequency of vibration of the cab. Because the known frequency of frame flexure about the nodes N and N' is 10, it would be desirable to utilize a spring 22 that would change the natural frequency of the cab 16 to a frequency of the about two-thirds or less and preferably one-half or less of the frame flexure frequency so that the magnification factor would be low, as indicated by the curve of FIG. 5. That is, the ratio of frame frequency to cab frequency should be at least 1.5 or greater, and preferably about 2 or greater. At the same time, the frequency of chassis pitch about the center of the frame is known to be two cycles per second and the ratio of this frame frequency to the cab frequency must not be unduly increased to the point where it approaches 1, because this would result in a high magnification factor with respect to this vibration, as shown by the curve of FIG. 5. From the curve, it will be appreciated that a frame frequency to cab frequency of less than about two-thirds (i.e., 0.67) and preferably less than one-half will provide a relatively low magnification factor.

From the above, it will be seen that some compromise in desired cab frequency must be reached, because while a reduction of cab frequency increases the ratio with regard to the frame flexure to values greater than one and therefore reduces the amplification, the reduction tends to raise the magnification factor of the chassis pitch vibration from a small fraction towards one, because the frame frequency of this vibration was originally small. A cab frequency of about five cycles per second would provide a good compromise because it would keep the frequency ratio of chassis pitch to cab vibration less than 0.66 and the frequency ratio of frame flexure about the spaced nodes to cab vibration greater than 1.5.

Thus, a spring 22 is desired that will change the cab frequency to approximately five cycles per second. This will be approximately half the flexure vibration frequency and yet twice the chassis pitch frequency.

The spring rate that will accomplish the above desired result is determined as follows:

An initial resilient means 22, such as a rubber block of a known spring rate of 20,800 pounds per inch, is connected between the cab 16 and the frame 18 at the central rear portion of the cab, as indicated in FIG. 1. With forcing frequencies of 10 cycles per second flexing the frame about the two nodes N and N' and 2 cycles per second flexing the frame about the center, a measured cab amplification of three to one is produced. It is determined by putting accelerometers on either side of the rubber block, one on the cab and one on the frame, and comparing the measurements. The load on the cab mount was computed to be about 600 pounds.

The friction force of the rubber cab mount 22 is computed to be approximately 150 pounds. This is determined by stressing the mounting and measuring the mounting as the stress is released. The difference in dimension is accounted for by friction and determines the amount of friction. The ratio of the friction force F to the load $P_0$ on the rubber mounting means is therefore 150 divided by 600, or a ratio of 0.25.

Using the ratio of F to $P_0$ of 0.25, the magnification factor of three, and the resonance diagram of FIG. 6, the actual ratio of the frame frequency to the cab frequency with the rubber mounting of known spring rate can be found. The diagram of FIG. 6 shows a family of curves for different ratios of friction force to exciting force or load on a graph on which the amplitude ratio is plotted against the ratio of frame frequency to cab frequency. From the graph, as indicated by the dotted lines, the ratio of frame frequency to cab frequency of the present example is approximately 0.8. Dividing the frame frequency of 10 by .8 gives the cab frequency as 12.5 cycles per second.

From the known cab frequency of 12.5 cycles per second, the moment of inertia of the cab about the fixed support is determined from the formula:

$$f = \frac{d}{2\pi}\sqrt{\frac{S}{F_\mathrm{I}}}$$

That is, frequency (f) equals the distance (d) in feet between the pivotal support 20 of the cab at point N to the rubber mounting spring 22 divided by $2\pi$ and multiplied by the square root of the spring rate (S) in pounds per inch divided by the moment of inertia ($F_1$) of the cab about the fixed support. The equation is solved for the moment of inertia of the cab. Thus, where the frequency is 12.5, the distance between the pivotal mount 20 and the rubber resilient mounting means 22 is 4.1 feet, the spring rate of the rubber mounting means 22 is 20,800 pounds per inch, the moment of inertia of the cab is equal to 56.5 slug-ft². The above formula is based on the formula for the natural frequency of vibration of a system having a single degree of freedom, typically expressed in the form $$f_\mathrm{n} = \frac{1}{2\pi}\sqrt{\frac{k}{m}}$$

where k is the spring rate and m is the mass of the system. See, e.g., "Mechanical Vibration," by J. P. Den Hartog, McGraw-Hill Publishing Co., 3rd ed., 1947, p. 45. The mass m can be expressed in terms of the moment of inertia $F_I$ of the mass about a fixed support and the radius of gyration d.

Knowing now the moment of inertia of the cab, the same formula can be used substituting for the actual frequency of the cab the desired frequency of five cycles per second, and solving for the desired spring rate S. The desired spring rate is therefore approximately 3300 pounds per inch. This would be sufficient to support the 600 pounds of the cab weight. A resilient rubber connection having a spring rate of 3300 pounds per inch is then used in place of the resilient mounting means used for the initial measurements.

Reference is now made to FIGS. 7 to 10 of the drawings showing a preferred construction of a pivot mounting or tilt suspension for a cab of a cab-over-engine truck. This tilt suspension permits rotation of the cab about a transverse axis adjacent the front of the truck. It also provides a spring mounting between the cab and the frame at the same location to reduce the frequency of cab vibration, as explained above. The spring of FIG. 7 corresponds to the schematically indicated spring 32 of FIG. 2 that cushions the cab from frame flexure about the node N while also changing the frequency of vibration of the cab.

Figure 7:
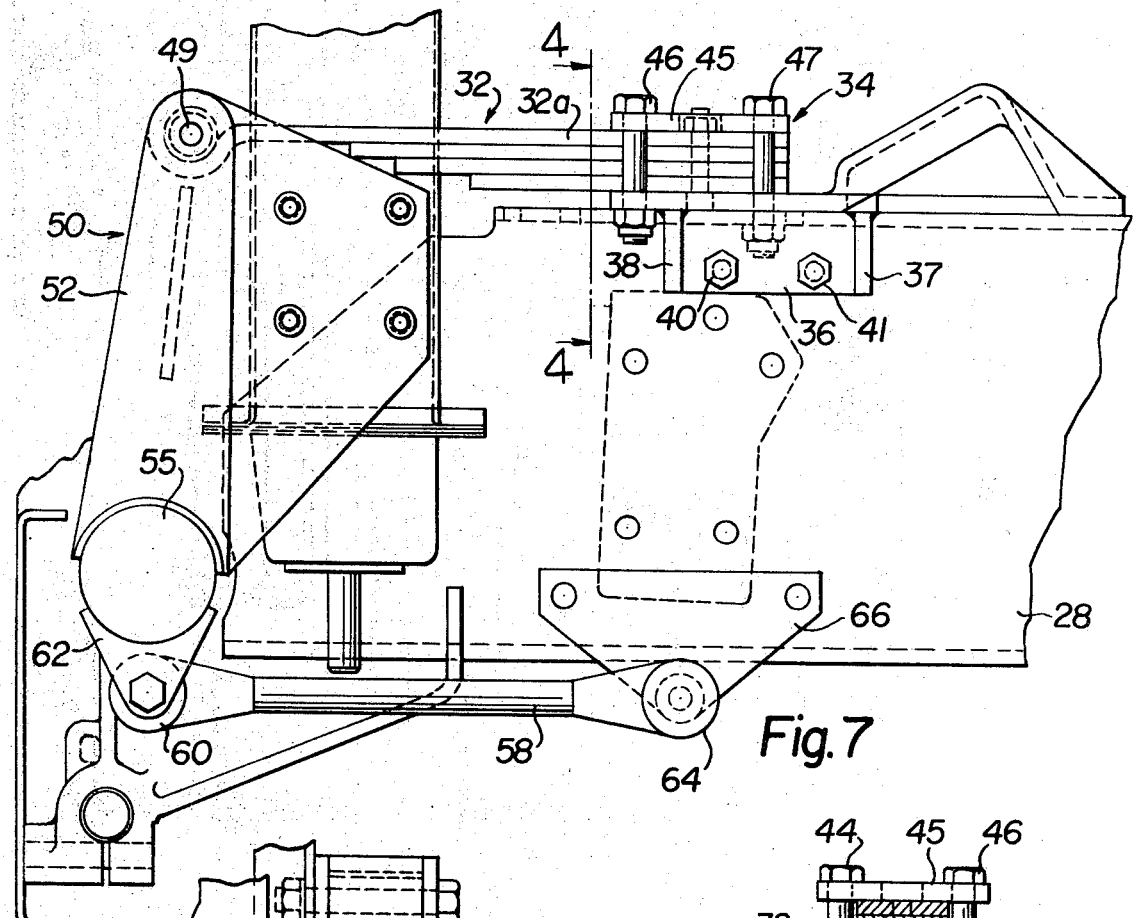
FIG. 7 is a partial side elevational view of a tilt suspension for a truck cab and showing an arrangement where a vibration dampening spring is included between the cab and the frame adjacent the pivotal connection about which the cab tilts.
Figure 9:
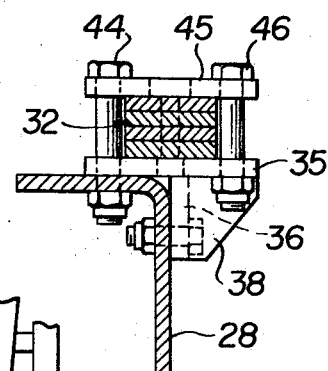
FIG. 9 is a partial sectional view taken along the lines 9—9 of FIG. 7.
Figure 8:
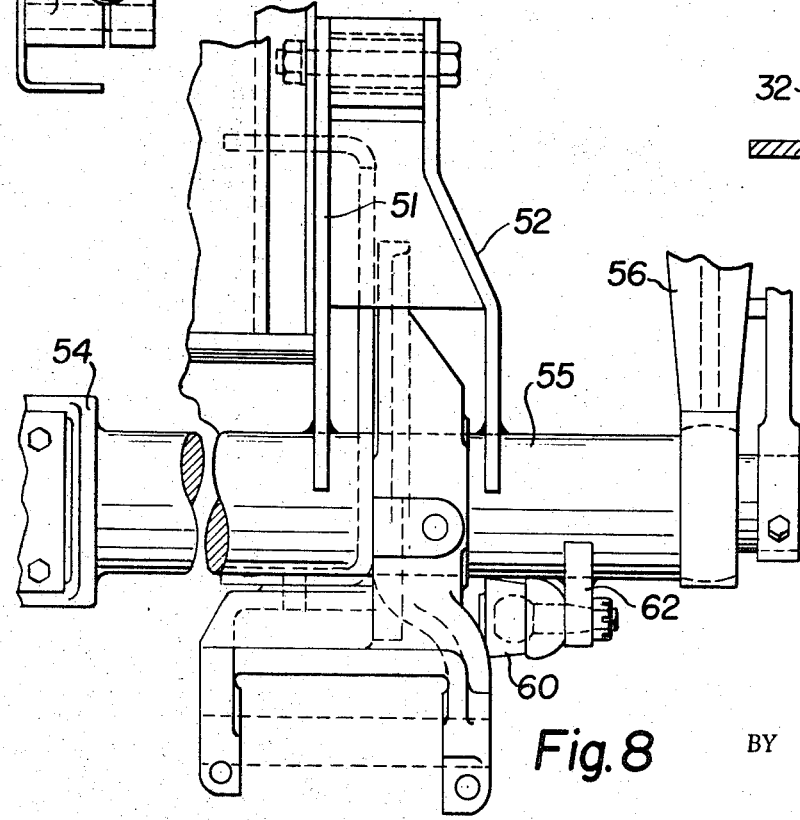
FIG. 8 is a partial front elevational view of the cab tilt suspension of FIG. 7.

FIG. 7 shows, in side elevation, a partial section of the frame 28 and the resilient mounting means 32. The resilient means 32 shown in the embodiment of FIG. 7 is a leaf spring clamped by a bracket 34 to the front end of a longitudinally extending chassis frame channel 28. Such a channel extends longitudinally along each side of the truck to form the frame, and it will be understood in this embodiment that the construction being described on one side of the front of the chassis frame is duplicated on the other side and that there are two resilient means 32 providing a combined spring rate determined in the manner above set forth. The spring bracket 34 includes a horizontal base 35, a vertical web 36 and a pair of spaced gussets 37 and 38. Two bolts 40 and 41 attach the web 36 to the web of the chassis frame channel 28 and a pair of spaced clamping bolts, one of which is shown at 44 in FIG. 8, attach the base 35 to the channel 28. The spring 32 is clamped between the base 35 and an upper clamp plate 45 by four bolts, three of which are shown at 44, 46 and 47. In this manner, the spring 32 is cantilevered to the front end of the chassis frame channel 28 and extends forwardly, terminating just beyond the end of the channel 28.

The upper and longest leaf 32a of leaf spring 32 is secured by a bolt 49 to a depending bracket 50 formed of horizontally spaced plates 51 and 52. A tubular torsion spring assembly 55 is fastened to the bottom of the plates 51 and 52, as by welding and extends transversely of the chassis frame just in front of the front end of each channel 28, and is fastened to the frame. The front of the cab of the truck is carried by the torsion spring assembly 55 by cab support brackets 56 on each side of the frame.

A tubular brace 58 is secured through a front ball socket 60 to a depending web 62 that is welded to the torsion spring assembly 55. The other end of the tube 58 is fastened by a rear ball socket 64 to a mounting plate bracket 66 secured to the frame channel 28. A similar brace is provided at the other end of the torsion spring assembly 55. These braces readily permit vertical, or more accurately, arcuate movement of the torsion spring assembly 55 as the spring 32 flexes, but prevent rotational movement of the torsion spring assembly 55 about its central longitudinal axis.

While not shown in detail, it will be seen from FIG. 2 that the cab 26 is also secured to the frame 28 at the rear portion of the cab, as by a conventional releasable bracket 30 that permits rotational flexing about the point N, to the extent permitted by the springs 32 and also releases the cab for tilting to provide access to the engine. Thus, the cab is secured to the frame at the back at location N on the frame by bracket 30 and is coupled to the frame at the front through spring elements 32, which have been selected in the manner above described to substantially reduce the cab amplification of frame vibrations. Notwithstanding the spring mounting in the front, the cab may nevertheless be tilted about the front, i.e., about the transverse axis of the torsion spring assembly 55, to permit access to the engine compartment.

Figure 12:
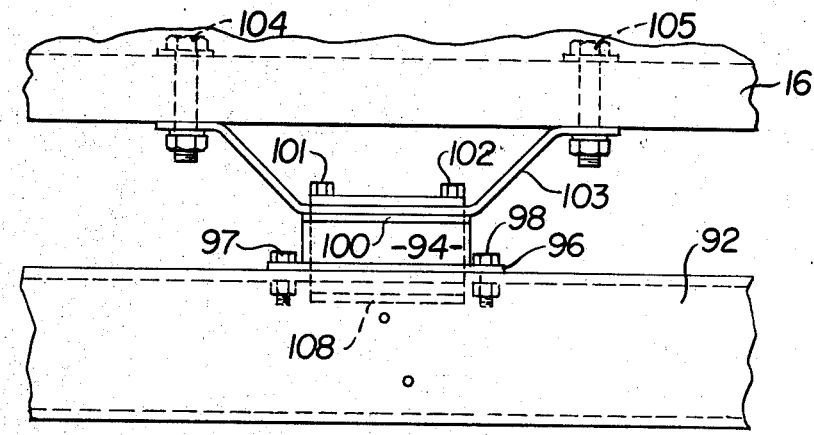
FIG. 12 is an end elevational view of the vibration dampening spring of FIG. 11.
Figure 13:
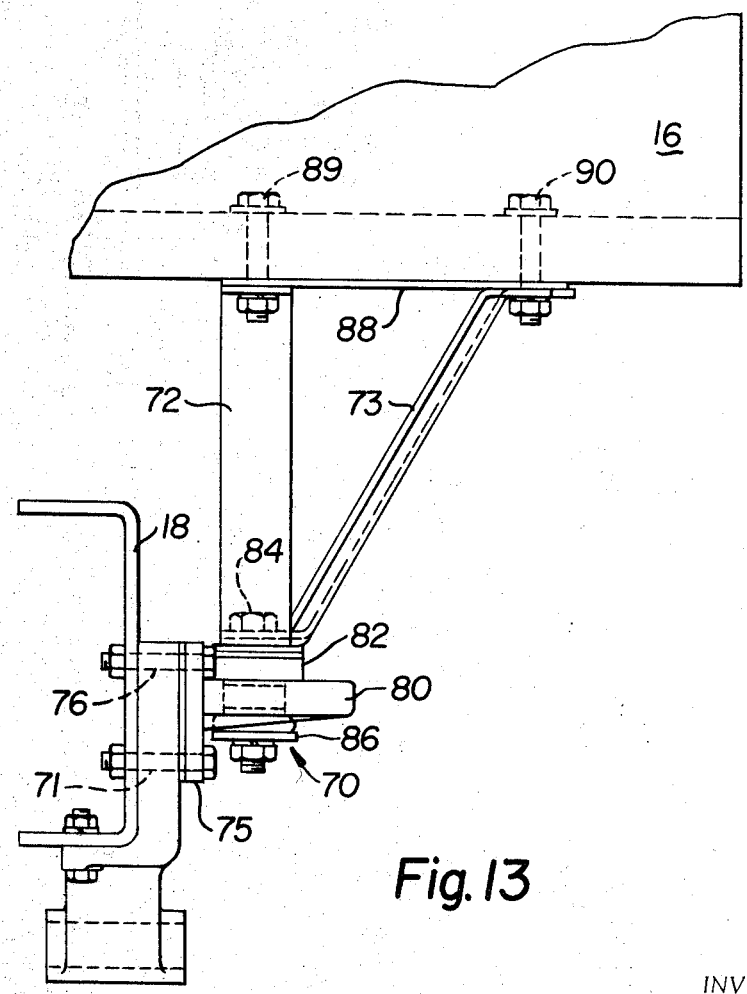
FIG. 13 is a front elevational view of the fixed mounting bracket for the cab, as shown in FIG. 11.

A specific construction for providing the mounting for a cab-behind-engine truck of the type schematically shown in FIG. 1, is shown in FIGS. 11 to 13 of the drawings.

The chassis is formed of longitudinally extending, transversely spaced channels 18. The cab 16 is carried above the frame channels 18 by the fixed front bracket 20 and the resilient means 22 at the rear central portion of the cab. A front bracket 20 is provided on each frame channel 18, thereby supporting the front portion of the cab at two transversely spaced locations. The two brackets being the same, only one will be described in detail.

The front mounting bracket indicated generally at 20 includes a frame mounting member 70 and three body support members 72, 73, and 74.

The frame mounting member 70 includes a flat mounting plate 75 fastened by three spaced bolts 76, 77, 78 to the web of the frame channel 18. An apertured outwardly extending lug 80 extends horizontally from the mounting plate 75. A rubber mounting bushing 82 is held within the lug 80.

Apertured bent end portions of each of the body support members 72, 73 and 74 are secured by a bolt 84 and washers 85 and 86 to the mounting bushing 82. The body support members 72, 73 and 74 extend upwardly from the frame mounting member 70 and fastened, with an intermediate strainer plate 88 to the bottom of the cab 16 by bolts 89, 90 and 91.

A transverse channel member 92 extends between the two longitudinal frame members 18 beneath the back portion of the cab 16. The resilient means 22 is fastened to the upper flange of the channel 92 at a location substantially mid-way between the two frame channels 18. The resilient means 22 is formed of a block of rubber 94 fastened to a bottom mounting plate 96 that extends transversely beyond the rubber block 94 to receive two mounting bolts 97 and 98, which bolt the mounting plate and rubber block to the upper flange of the channel 92. An upper mounting plate 100 is fastened to the top of the rubber block 94 and has two upwardly extending bolts 101, 102 that pass through holes in a mounting bracket 103 that is fastened to the bottom of the cab 16 above the rubber block 94 by bolts 104 and 105. A C-shaped fail-safe member 108 is fastened to the bracket 102 by the same bolts 101, 102 that fasten the bracket 103 to the rubber block 94. The member 108 extends downward and then inward beneath the flange of the channel 92. It extends downward far enough to permit the degree of stretching of rubber block 94 that will normally be necessary, but will limit the upward movement of the rear of the cab 16 in the event the rubber block 94 should fail. It will also prevent undue stress from being applied to the rubber block 94 due to forces beyond those normally encountered that tend to rotate the cab 16 about the front mounting brackets 20.

The rubber block 94 is selected with characteristics that will modify the natural frequency of vibration of cab 16, in accordance with the procedure outlined above. Thus, the cab 16 is supported by two forward brackets 20 at the node N of the frame members 18. The flexible rubber mounting bushings 82 permit limited pivotal movement of the cab 16 about the point N. The rubber block 94 not only has a cushioning effect upon vibrations transmitted to the cab 16 from the frame 18, but also has been chosen to modify the characteristics of the cab 16 so that its natural frequency of vibration does not coincide with the frequency of frame flexure or the frequency of chassis pitch about the center of the frame.

As will be apparent from the description of the embodiments above, the resilient means for mounting the cab to the frame, which resilient means changes the natural frequency of vibration of the cab, may take various forms. Although it has been specifically disclosed in the form of a leaf spring and in the form of a resilient rubber block, it will be readily apparent that other resilient means, such as a coil spring or torsion bar and linkage could be substituted. The resilient means selected must, of course, have a sufficient spring rate to support the weight of the cab and also must not be so stiff as to amount to an unduly rigid connection between the vibrating portion of the frame and the cab. Thus, it is contemplated that the spring rate of the resilient means selected in the manner set forth herein, will not be so low as to change the frequency of the vibration of the cab to a value where the ratio of frame flexure frequency to cab frequency will be less than one, and will not be so stiff that the cab frequency will be changed where the ratio of chassis pitch frequency to the cab frequency will be greater than one.

In selecting the proper resilient means for changing the frequency of the cab vibration, it will be appreciated that the spring rate chosen must be consonant with the requirement that the spring adequately support the weight of the cab member. Thus, in the example above, a cab frequency of five cycles per second was chosen, between the low frequency of two cycles per second of the chassis pitch and the high frequency of ten cycles per second of the frame flexure about the two spaced nodes. This maintained the ratio of frame frequency to cab frequency below 0.66 with respect to the chassis pitch vibration and above 1.5 with respect to the ratio of frame frequencies due to flexure about the nodes to the cab frequency. As shown by the graph of FIG. 4, this maintained the magnification factor relatively low.

If the graph of FIG. 4 alone were considered, it can be seen that an extremely low cab frequency of vibration, for example, on the order of one cycle per second, would locate both points of frame frequency to cab frequency on the right hand curve of the graph on a low portion of a curve, indicating low magnification or amplification of the frame vibrations. However, from the formula by which the spring rate is related to the frequency, it can be seen that the extremely low spring rate necessary to do this would be inadequate to support the weight of cab. Thus, it is not practical to modify the cab frequency to a degree that will raise the ratio of chassis pitch about the center of the frame to the cab frequency to value greater than one, and therefore it must be maintained quite low if a low magnification factor is to be attained.

Similarly, at the other extreme, the spring chosen to modify the natural frequency of vibration of the cab must not be so stiff that it fails to provide a cushion between the vibrating portion of the frame and the connected portion of the cab removed from the node N. Thus, again, considering only the graph of FIG. 4, it can be seen that a very high frequency of vibration of the cab would result in ratios of chassis pitch about the center of the frame to cab frequency and frame flexure about the nodes to cab frequency of perhaps 0.66 or 0.5 and below. Thus, both points would now appear on the left-hand curve of the graph of FIG. 4. However, from the formula relating frequency to spring rate, it can be seen that to achieve a cab frequency of a least 20, which would be needed to change the ratio of frame flexure about the nodes to cab frequency to a value of 0.5 or below, a spring rate of about 60,000 pounds per inch would be needed. Such a spring would hardly flex where the cab weight is 600 pounds.

In summary, while it is of course recognized that different vehicles having different frequencies of vibration will require different spring rates to reduce the cab amplification of frame vibration, a method and apparatus for consistently reducing the amplification to a minimum degree has now been provided. Thus, while certain preferred embodiments of the invention can been disclosed in the foregoing specification, numerous modifications or alterations may be made therein without departing from the spirit and scope of the invention as set forth in the appended claims.

What is claimed is:

1. In a cab-over-engine truck in which the cab tilts about a front end of the truck, the combination of a frame, including two longitudinally extending, transversely spaced, members terminating adjacent the front end of the truck; a pair of transversely spaced springs fastened to the frame at the front of the truck; a torsion spring assembly extending transversely of the frame, supported by said pair of springs, and serving to counterbalance the weight of the cab when tilted; means connected with the torsion spring assembly to prevent rotational movement of the spring assembly about a longitudinal axis thereof; and a truck cab fastened to the torsion spring assembly for pivotal tilting movement about the torsion spring assembly, relative to the frame.

2. In a cab-over-engine truck in which the cab tilts about a front end of the truck, the combination of a truck frame or chassis, a cab tiltable about the front of the frame, pivotal support means for supporting the cab and allowing the cab to be tilted about the front of the frame, spring means at the front of the frame for mounting said pivotal support means to the frame, and means located rearwardly of the front of the frame to support a portion of the cab located behind the pivotal support means on the frame.

3. In a cab-over-engine truck in which the cab tilts about a front end of the truck, the combination of: a truck frame or chassis; a cab tiltable about the front of the frame; means at the front of the cab, between the cab and the frame, to resiliently support the front of the cab relative to the frame and to at least partially insulate the cab from frame vibrations, said means including a torsion spring assembly about which the cab tilts; and means carried by the frame, located rearwardly of the front of the frame, to support a portion of the cab located behind the support means at the front of the cab.

4. In a truck in which a cab tilts about a front end of the truck between raised and lowered positions, the combination of: a truck frame or chassis; a cab carried by the frame; a cab support on the frame adjacent the front thereof, pivotally connecting the cab to the frame for tilting about a pivot axis that extends across the frame, and including means between the frame and the pivot axis of the cab for resiliently supporting the cab relative to the frame when the cab is in a lowered position; and means carried by the frame, located rearwardly of the front of the frame, to support a portion of the cab located behind the front connecting means.

5. In a cab-over-engine truck in which the cab tilts about a front end of the truck, the combination of: a truck frame or chassis; a cab tiltable about the front of the frame; a pivot connection between the frame and the front of the cab establishing an axis across the frame, about which the cab tilts; a resilient support for the front of said cab between said pivot axis and one of said frame and cab; and means carried by the frame, located rearwardly of the pivot connection, to support the rear of the cab.

6. In a cab-over-engine truck in which the cab tilts about the front end of the truck, a front-end cab support assembly supported by two transversely spaced longitudinally extending frame channels, said assembly comprising a cantilevered leaf spring fastened to the front end of each frame channel and extending forwardly thereof, a support bracket carried by the forwardly extending portion of each leaf spring, a transversely extending torsion spring assembly extending transversely across the front of the frame and supported at spaced locations by the said brackets, a pair of braces connected at spaced locations along the torsion spring assembly between the torsion spring assembly and the truck frame and constructed and arranged to permit generally vertical movement of the torsion spring assembly in an arcuate path while restraining rotational movement of the torsion spring assembly about a central longitudinal axis thereof, and means for mounting a front portion of the cab to the torsion spring assembly for rotational movement about the central longitudinal axis thereof.

7. The truck of claim 6 wherein the leaf springs are constructed and arranged of a predetermined spring rate to substantially reduce a predetermined natural frequency of vibration of the cab.

8. A cab-over-engine truck which comprises a frame that flexes about two longitudinal spaced nodes, a pivotal cab support adjacent the front of the frame, a cab that tilts adjacent its front end about the pivotal support and that is supported adjacent the rear end directly by the frame at one of said nodes, and and spring means on the frame adjacent the front of the cab supporting the pivotal support.

9. A cab-over-engine truck which comprises an elongated frame that flexes about two longitudinally spaced nodes, a cab carried by the frame tiltable adjacent its front end relative to the frame between lowered and raised positions and supported adjacent the rear end of the cab by the frame at one of said nodes when in a lowered position, and a cab support on the frame adjacent the front thereof, pivotally connecting the cab to the frame for tilting about a pivot axis that extends transversely of the frame, said cab support including resilient support means between the frame and the pivot axis of the cab.

10. In a method of controlling the frequency of vibration of a truck cab, said cab being firmly mounted to an elongated truck frame at a first location spaced from the center of gravity of the cab, and mounted on the frame by spring means at another location longitudinally spaced from said first location a distance $d$, which cab has a moment of intertia $F_I$ about a transverse axis at said first location spaced from the center of gravity of the cab and vibrates at a frequency $f_{cab}$, and which frame tends to vibrate in at least two frequencies, one frequency $f_F$ about two nodes longitudinally spaced along the frame and another frequency $f_c$ about the central portion of the frame, the steps comprising: determining the frequencies $f_{cab}$, $f_F$ and $f_c$, and providing said spring means between the frame and the cab with a spring rate S that is related to cab frequency $f_{cab}$ in accordance with the formula $$S = \frac{4\pi^2 f^2{}_{cab} F_\mathrm{I}}{d^2}$$

for values of $f_{cab}$ that are both greater than $1.5 f_c$ and less than $0.66 f_\mathrm{F}$.

References Cited

UNITED STATES PATENTS

| | | | |
|---|---|---|---|
| 2,708,134 | 5/1955 | Sewelin et al. | |
| 2,864,121 | 12/1958 | Imber et al. | 180—89X |
| 2,951,548 | 9/1960 | Crockett et al. | |
| 3,010,757 | 11/1961 | De Haan. | |
| 3,129,973 | 4/1964 | Maruhn. | |
| 3,276,812 | 10/1966 | Fisher | 296—35 |

FOREIGN PATENTS

| | | |
|---|---|---|
| 926,834 | 5/1963 | Great Britain. |
| 929,171 | 6/1963 | Great Britain. |

OTHER REFERENCES

DAS 1,109,539, German printed application June 1961, Daimler.

BENJAMIN HERSH, Primary Examiner

J. A. PEKAR, Assistant Examiner

U.S. Cl. X.R.

296—35